United States Patent Office 3,798,323
Patented Mar. 19, 1974

3,798,323
METHODS OF CONTROLLING MYCOTOXIN PRODUCTION USING CERTAIN DIALKYL ENOL PHOSPHATES
John S. Leary, Jr., Alamo, Calif., assignor to Shell Oil Company, Houston, Tex.
No Drawing. Filed Aug. 25, 1971, Ser. No. 174,975
Int. Cl. A01n 9/36
U.S. Cl. 424—212    11 Claims

ABSTRACT OF THE DISCLOSURE

Mycotoxin production by a fungus is controlled or inhibited by subjecting the fungus to an effective amount of a dialkyl enol phosphate.

BACKGROUND OF THE INVENTION

This invention relates to a method of controlling or inhibiting mycotoxin production by fungi. More particularly, this invention relates to a method of controlling or inhibiting the production of mycotoxins by fungi of the class Fungi Imperfecti by subjecting the fungi to an effective dosage of a dialkyl enol phosphate.

Thoughout the world each year, a considerable portion of the world's food supply is destroyed by the action of various fungi and bacteria. In addition, fungi produce various substances refered to as mycotoxins, which are poisonous to warm blooded animals. Mycotoxins are produced on foodstuffs under certain conditions of temperature, oxygen level, nutrient type and moisture content and are of particular concern to the food industry, especially those concerned with the production of cereal grains and nuts.

Fungi, such as those of the genus Aspergillus, themselves are not toxic and even the species Aspergillus flavus in the soil will not usually invade the growing plant or its seeds until the shell, husk or epidermis of the plant or seeds have become damaged. However, when the invasion does take place in a few seeds, enough mycotoxins can be produced to make a large store of seeds toxic to warm blooded animals. The nature of this protective mechanism in the shells and husk of the nuts or seeds is not known. It is known, however, that once this protective coating or membrane has been damaged that the seed becomes subject to the fungi which will then produce mycotoxins.

Typical mycotoxins produced by the class Fungi Imperfecti and the principal producing species are listed in the following table.

TABLE

| Species: | Mycotoxin |
|---|---|
| Fusarium tricinctum | Sporofusariogenin. |
| Cladosporium epiphylum | Epicladosporic acid. |
| Cladosporium fagi | Fagicladosporic acid. |
| Penicillium islandicum | Islanditoxin; luteoskyrin. |
| Penicillium rugulosum | Ruguiosin. |
| Penicillium tardum | Ruguiosin. |
| Penicillium brenneum | Ruguiosin. |
| Penicillium urticae | Patulin. |
| Penicillium citrinum | Citrinin. |
| Penicillium notatum | Xanthocillin. |
| Penicillium citreoviride | Citreoviridin. |
| Aspergillus fumigatus | Fumagillin; gliotoxin; helvolic acid. |
| Aspergillus terreus | Terreic acid. |
| Fusarium graminearum | Zearalenone. |

TABLE—Continued

| Species: | Mycotoxin |
|---|---|
| Aspergillus flavus | Aflatoxin $B_1$; aflatoxin $G_1$; aflatoxin $B_2$; aflatoxin $G_2$; aflatoxin $M_1$; aflatoxin $M_2$; aspergillic acid; aspertoxin. |
| Penicillium rubrum | Rubratoxin B. Cyclopiazonic acid. |
| Penicillium cyclopium | Ochratoxin A. |
| Aspergillus ochraceus | Trichodermin. |
| Trichoderma viride | Trichothecin; 6 - beta-hydroxy-rosenonolactone. |
| Trichothecium roseum | Diacetoxyscirpenol. |
| Fusarium scirpi | Diacetoxyscirpenol. |
| Fusarium roseum | Diacetoxyscirpenol; T - 2 toxin; 4 - acetamido-4-hydroxy - 2 - butenoic acid-gamma-lactone. |
| Fusarium tricinctum | |
| Fusarium roseum var. graminearium | F-2 toxin. |

The mycotoxins of particular concern throughout the world at present are the aflatoxins. Aflatoxins are primarily the toxic metabolites produced by the class Aspergillaceae and particularly by the genera Aspergillus and Penicillium. The primary producer of aflatoxins is the species Aspergillus flvus (as noted in the table above) marily the toxic metabolites produced by the class Aspergillaceae and particularly by the genera Aspergillus and of mycotoxins known and even in low dosages are potent heptaocarcinogens. In addition, aflatoxins have been demonstrated in test animals to reduce fertility, produce malformations in offspring and cause liver damage.

Aflatoxins are designated $B_1$, $B_2$, $G_1$, $G_2$, $M_1$ and $M_2$. Aflatoxins $B_1$, $B_2$, $G_1$ and $G_2$ are produced by the fungi and are named on the basis of the color of fluorescence on thin layer chromatography plates. The letter B thus stands for blue fluorescence and the letter G stands for green fluorescence. The M aflatoxins are animal metabolites of the $B_1$ and $G_1$ aflatoxins and are referred to as "milk toxins."

These aflatoxins possess the following chemical structures:

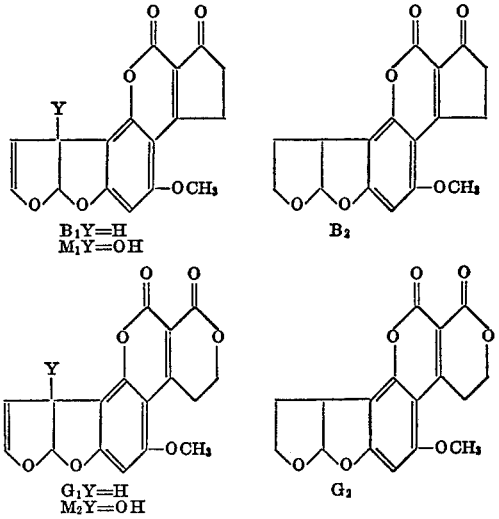

$B_1 Y=H$
$M_1 Y=OH$ $B_2$ $G_1 Y=H$
$M_2 Y=OH$ $G_2$

Various methods have been proposed to either inhibit the growth of the fungi on foodstuffs or to prevent the fungi from producing aflatoxins. Such methods as storage conditions under either high or low temperatures have been proposed. Other methods include storage under various gaseous substances, and chemical treatment of foodstuffs prior to use in order to detoxify the food.

DESCRIPTION OF THE INVENTION

It has now been found that mycotoxin production can be controlled or greatly inhibited by subjecting the mycotoxin producing fungi to an effective dosage of a dialkyl enol phosphate of the formula:

$$\begin{array}{c} R\diagdown \\ O \\ \diagup \\ R' \end{array} P \begin{array}{c} O \\ \parallel \\ \diagup \\ O \end{array} O-C=C \begin{array}{c} Y \\ \diagdown \\ Z \end{array}$$

wherein R and R' are $C_1$–$C_4$ alkyl and may be the same or different, A is H or $CH_3$, Y is H or halogen and Z is halogen or $$-\overset{O}{\overset{\parallel}{C}}OR$$

By halogen is meant middle halogen and particularly chlorine or bromine with chlorine being preferred.

Preferred are those compounds of the formula:

$$\begin{array}{c} R\diagdown \\ O \\ \diagup \\ R' \end{array} P \begin{array}{c} O \\ \parallel \\ \diagup \\ O \end{array} OCH=C \begin{array}{c} Cl \\ \diagdown \\ R'' \end{array}$$

wherein R and R' are as defined above and R'' is hydrogen or chlorine. Especially preferred is dimethyl 2,2-dichlorovinyl phosphate hereinafter referred to as DDVP, and diethyl 2-chlorovinyl phosphate.

The mechanism by which this invention operates is not one of fungicidal activity in that the growth of fungi is not prevented. High concentrations of the dialkyl enol phosphates do not appear to inhibit the growth of the fungi but have been observed to prevent or suppress sporulation. Studies conducted using lower concentrations of the enol phosphate indicate that neither mycelia growth nor sporulation were affected; however, the amount of aflatoxin produced was greatly inhibited and in some cases no measurable mycotoxin was produced at all.

These enol phosphates may be administered in a variety of ways according to the substrate that is to be protected from mycotoxin formation. The enol phosphate can be applied directly to the fungi or to the substrate to be protected. Moreover, the enol phosphate may be administered as a spray, vapor, dust, solution, etc. For example, when applying directly to the fungi, the enol phosphate may be poured or sprayed or otherwise placed upon the fungi as a solution. When cereal grains or nuts and the like are to be protected against mycotoxin production by invading fungi, the grain or nuts or whatever the substrate is, may be treated by applying the enol phosphate as a vapor or the substrate can be submerged in a dilute solution of the enol phosphate and then removed and dried.

While this invention is not limited to any particular method of application, it will be obvious to those skilled in the art that the easiest method of application is to apply the enol phosphate in the form of a vapor. For example, the enol phosphate may be made up as an aerosol under pressure, which when the pressure is released, releases active ingredient into the atmosphere, or the vapor may be generated by means of the application of heat to the appropriate enol phosphate in order to vaporize it. The most preferred method of application is to us a resinous generator such as those described in U.S. Pat. 3,318,769. In that application, enol phosphates are incorporated into resinous compositions such as those comprising a plasticized polyvinyl chloride.

The concentration of dialkyl enol phosphates to be used is dependent entirely upon the method of application and upon the substrate to be protected. For example, it is obvious that a 1,000 cu. ft. room one-third full of a substrate such as peanuts or coffee beans would require less of the active ingredient than would the same room two-thirds full. In general, concentrations of 1 to 20 p.p.m. of active ingredient on the substrate will be effective. However, depending upon the degree of control desired, higher concentrations may be employed.

The invention will be described more particularly with reference to the following examples.

EXAMPLE I (A) Aflatoxin production and extraction

Aspergillus flavus var. parasiticus, ATCC No. 15517, known aflatoxin producer, was employed and stock cultivated on Difco Sabouraud maltose agar slants grown at 25° C. 25 grams of shredded wheat were placed in wide-mouth, glass, screw-top jars and sterilized, after which 50 milliliters of sterile water was added to each. One milliliter of spore suspension from a stock slant was inoculated onto this substrate and incubated at 27° C., 70% relative humidity, with the vessel covers very loosely attached.

Two separate tests were conducted. In one test 10.0 grams of a resin generator strip comprising 70% polyvinyl chloride (PVC) 10% dioctyl adipate (DOA), and 20% dimethyl 2,2-dichlorovinyl phosphate (DDVP), were suspended above the inoculated substrate and the covers to the jars loosely attached. In this test control jars containing PVC resin plasticized by DOA but containing no DDVP were incubated in separate chambers under identical conditions. In the other test, open jars were incubated in a 512 cubic foot environmental chamber at 27°, 95% relative humidity, which had been pre-equilibrated with a DDVP-PVC resin strip.

Concentration of DDVP in air samples were determined by standard methods. 20 liter volumes were routinely sampled. The DDVP concentration in terms of milligrams per liter was determined for the glass jars by flushing a three-neck distilling flask with 20 liters of air which was incubated under identical conditions to the wide-mouth jars. The DDVP concentration was found to be 216 micrograms per liter. In the 512 cubic foot room equilibration was brought about by introducing the DDVP-PVC strips into the chamber three days prior to the beginning of incubation and the average concentration of DDVP in the air within the chamber varied from an average of 3.53 micrograms per liter at the beginning of incubation, to 2.05 micrograms per litre on the seventh day of incubation.

Following incubation, the cultures were extracted for aflatoxin by adding 150 milliliters of chloroform at 55–60° C. and shaking on a reciprocating shaker for twenty minutes at room temperature. The chloroform extract was poured through cheesecloth and filtered through glass wool and Whatman No. 1 filter paper. This procedure was repeated three times, and the filter paper and glass wool were then rinsed with a minimal amount of acetone. The filtrate was pooled, measured and analyzed for aflatoxin.

(B) Fluorometric analysis for aflatoxin

Aflatoxin was quantitated from standards of aflatoxins $B_1$ and $G_1$ in chloroform, applied to thin layer chromatography (TLC) plates and developed in solvent of 97:3 $CHCl_3$:$CH_3OH$ (parts per volume). TLC plates were scanned automatically in a Turner Model III fluorometer.

Table I depicts the influence of DDVP on the production of aflatoxin as determined fluorometrically.

TABLE I

[The influence of DDVP on the production of aflatoxin by *aspergillus flavus*

| | DDVP concentration [b] | Aflatoxin/25 g. shredded wheat [a] | | | | | | | | |
|---|---|---|---|---|---|---|---|---|---|---|
| | | $B_1$ | | | $G_1$ | | | $B_1$ and $G_1$ | | |
| | | Mg. | Percent | X fold decrease | Mg. | Percent | X fold decrease | Mg. | Percent | X fold decrease |
| Control | 0.0 | 17.5 | 100 | ---------- | 7.5 | 100 | ---------- | 25 | 100 | ---------- |
| 512 cu. ft. hut | 3.5–2.0 | 1.0 | 5.7 | 17.5 | 0.25 | 3.33 | 30 | 1.25 | 5 | 20 |
| Glass jars | 216 | 0.3 | 1.7 | 58.3 | 0.20 | 2.67 | 37.5 | 0.5 | 2 | 50 |

[a] Determined at the end of six days' incubation. [b] Micrograms/liter.

As is evident from the above table, the lower concentrations of DDVP, i.e., 2 to 3½ micrograms per liter air space, resulted in a decrease of the $B_1$ and $G_1$ aflatoxin some 17.5–30 times, whereas at the higher concentrations in the covered glass jars, the decrease was significantly greater, i.e. 58.3 and 37.5 times.

(C) Biochemical analysis for aflatoxin

To corroborate the above effects, as determined by analytical chemical methods, a bioassay using chicken embryo mortality in embryonating eggs was performed. The filtrate that was pooled and measured for fluormetric analysis of aflatoxin was treated by evaporating the chloroform under free-flowing air. The residue was suspended in 15 milliliters of propylene glycol and sterilized by passage through a 0.45 micron filter prior to biological assay. The biological assay method used was similar to that adopted by Verrett et al. in J.A.O.A.C. 47, 1003–1006 (1964). The bioassays were based upon the mortality resulting from injection of the culture extracts into fertile White Leghorn chicken eggs via the air sac route. Egg inoculation was performed by drilling through the shell at the air sack, injecting 0.05 milliliter of the sterilized propylene glycol extract and sealing the shell with molten wax. The eggs were then incubated within an incubator at 101° F. and candled at 5 days and 10 days to determine the number of viable embryos Groups of 30 eggs were used per dose level sample and mortality data were corrected from the number of infertile eggs The inoculations were made from the extracts obtained by extracting the aflatoxin from the glass jars containing 10 grams PVC-DDVP resin strips. The inoculations were made using the undiluted extract and extracts diluted with propylene glycol at dilutions of 1–20, 1–40, 1–80, 1–60 and 1–240. The results are reported in Table II.

TABLE II

| Test group | Extract dilution | Five-day embryo mortality |
|---|---|---|
| *A. flavus* positive control | Undiluted | 30/30 |
| | 1/20 | 30/30 |
| | 1/40 | 30/30 |
| | 1/80 | 30/30 |
| | 1/160 | 30/30 |
| | 1/240 | 27/27 |
| *A. flavus* plus DDVP-PVC strip [a] | Undiluted | 30/30 |
| | 1/20 | 27/30 |
| | 1/40 | 0/23 |
| | 1/80 | 0/25 |
| | 1/160 | 0/25 |
| | 1/240 | 0/28 |
| *A. flavus* plus blank PVC strip [a] | Undiluted | 28/28 |
| Blank PVC strip only | Undiluted | 21/26 |
| Propylene glycol only | Undiluted | 2/27 |
| Uninoculated control | Undiluted | 0/27 |

[a] 10 gram strip.

From the above results it is evident that the positive control containing no DDVP caused chick embryo mortality even at a dilution of 1 part to 240, whereas the group containing the DDVP produced no mortality at dilutions of 1 to 240. This data corresponds with the data contained in Table I which shows that there is considerably less aflatoxin produced in the presence of DDVP, and hence lower mortality at corresponding dilutions of the extract when inoculated into chicken eggs.

A further observation made from the above tests was that at the concentration of 216 micrograms per liter of DDVP, the DDVP did not inhibit the mycelial growth but did prevent spore formation in the *Aspergillus flavus*. However, at the lower air concentrations, i.e., 3.5–2.0 micrograms per liter there was no visible inhibition of mycelial growth or sporulation although a marked decrease in aflatoxin production was still observed.

EXAMPLE II

The procedure used in Example I was followed for producing aflatoxin, extracting it, and inoculating eggs to determine the chicken embryo mortality. The results are recorded in Table III.

TABLE III

| Test group | Embryo mortality | |
|---|---|---|
| | 5th day | 10th day |
| *A. flavus* positive control | [a] 20/20 | ---------- |
| *A. flavus* plus blank PVC strip | 14/15 | 14/15 |
| *A. flavus* plus DDVP-PVC strip | 0/17 | 0/17 |

[a] Number of eggs killed over number of fertile eggs on test.

This table confirms the results obtained in Example I. During this test sporulation was abundant in the positive control culture and in the blank strips containing no DDVP. However, no evidence of sporulation could be detected on a mycelial mat which developed in the DDVP atmosphere.

EXAMPLE III

Another test following the procedures of Example I was completed, with the results being reported in Table IV.

TABLE IV

| Test group | Embryo mortality | |
|---|---|---|
| | 5th day | 10th day |
| *A. flavus* positive control | 24/24 | ---------- |
| *A. flavus* plus blank PVC strip | 30/30 | ---------- |
| *A. flavus* plus DDVP-PVC strip | 5/29 | 5/29 |
| Blank PVC strip control | 0/29 | 0/29 |
| DDVP-PVC strip control | 1/29 | 1/29 |
| Propylene glycol control | 2/29 | 2/29 |

These results again confirm the results contained in Examples I and II and show the marked activity on the part of DDVP by significantly reducing aflatoxin production, spore prevention was again evident in this test.

EXAMPLE IV

Again following the procedure of Example I, an additional study was made to confirm the results of the preceding tests. In addition to inoculating the chicken eggs with undiluted extract, dilutions of 1/5, 1/10 and 1/20 were also made. The results of this study are reported in Table V.

TABLE V

| Test group | Extract dilution | 5-day embryo mortality |
|---|---|---|
| A. flavus positive control | Undiluted | 36/36 |
|  | 1/5 | 35/35 |
|  | 1/10 | 37/39 |
|  | 1/20 | 37/39 |
| A. flavus plus PVC blank[a] | Undiluted | 35/3 |
|  | 1/5 | 34/49 |
|  | 1/10 | 32/30 |
|  | 1/20 | 33/37 |
| A. flavus plus DDVP-PVC[a] | Undiluted | 3/39 |
|  | 1/5 | 4/49 |
|  | 1/10 | 2/37 |
|  | 1/20 | 3/30 |
| Propylene glycol control | Undiluted | 3/36 |
| Active strip control[a] | Undiluted | 3/38 |
| Blank strip control[a] | Undiluted | 5/40 |

[a] 10 gram strips.

EXAMPLE V

*Fusarium roseum* var. *graminearum*, known producer of mycotoxin F-2, was cultured on a mixture of wheat and rice. The positive control sample contained no DDVP whereas the sample under test contained 20 parts per million by weight of DDVP. Both samples were incubated for six weeks at 28° C. and for eight weeks at 10° C. At the conclusion of the incubation period the samples were extracted by standard procedures and tested for F-2 concentration. The results are recorded in Table VI.

TABLE VI

| | F-2 concentration (p.p.m.) | |
|---|---|---|
| Test | Control | 20 p.p.m. DDVP |
| 1 | 128 | 0 |
| 2 | 144 | 0 |
| 3 | 176 | 0 |

From this example it is evident that the enol phosphates, DDVP in particular, are effective in inhibiting the production of mycotoxins other than aflatoxins.

In the following three examples the fungus *Aspergillus flavus* NRRL 2999 was cultured on corn, wheat, rice and/or shelled peanuts. The cereal grains had a moisture content of about 20% whereas the moisture content of the peanuts was about 17.3%. All of these foodstuffs were autoclaved for 30 minutes at 120° C. and shaken to prevent caking and then reautoclaved 24 hours later.

DDVP was diluted with water so that the desired residue deposits would result when 1 milliliter of the dilution was applied per sample. Uniform DDVP applications were achieved by tumbling the treated sample for several minutes in a gallon jar. Both treated and control samples were transferred in 100 gram lots to separate sterile flasks, wherein each was inoculated with 0.1 gram of a presoaked soil culture of *Aspergillus flavus* and incubated 7 days at about 27° C. and 70% relative humidity. Quantitative determinations of aflatoxin were then made.

EXAMPLE VI

In this example the foodstuffs were first treated with DDVP at 20 parts per million by weight and were then inoculated with the *Aspergillus flavus* with the results being reported in Table VII.

TABLE VII

| Treatment | Run | Aflatoxin concentration (p.p.m.) in— | | | |
|---|---|---|---|---|---|
| | | Rice | Corn | Wheat | Peanuts |
| DDVP | 1 | 14.9 | + | 0 | + |
| | 2 | 11.2 | + | 0 | + |
| | 3 | + | + | 0 | + |
| None (control) | 1 | 40.2 | 75.6 | 57.5 | 220.4 |
| | 2 | 114.5 | 113.0 | 113.0 | 243.3 |
| | 3 | 33.7 | 77.8 | 115.0 | 376.2 |

+ Presence confirmed by thin-layer chromatography but not measurable by UV spectrophotometry.

These results show that DDVP residues of 20 parts per million by weight are highly effective against the production of aflatoxin on wheat, corn and peanuts and significantly reduced aflatoxin production on rice.

EXAMPLE VII

In this example wheat was treated so as to have DDVP residues of 0, 5, 10 and 20 parts per million by weight on separate samples which were then inoculated with *Aspergillus flavus*. The results are recorded in Table VIII.

TABLE VIII

| DDVP residue in wheat (p.p.m.) | Run | Aflatoxin concentration (p.p.m.) |
|---|---|---|
| 5 | 1 | 92.3 |
| | 2 | 76.3 |
| | 3 | 29.9 |
| | Avg. | 66.3 |
| 10 | 1 | 113.0 |
| | 2 | 33.6 |
| | 3 | 38.1 |
| | Avg. | 61.5 |
| 20 | 1 | + |
| | 2 | + |
| | 3 | + |
| | Avg. | |
| 0 (control) | 1 | 113.0 |
| | 2 | 92.3 |
| | 3 | 114.0 |
| | Avg. | 106.4 |

+ Presence confirmed by thin-layer chromatography but not measurable by UV spectrophotometry.

The data presented in this example shows that even at levels of 5 and 10 parts per million by weight DDVP significantly reduces the aflatoxin content over corresponding untreated controls.

EXAMPLE VIII

This example shows the results of first inoculating wheat with *Aspergillus flavus* and then 2 and 4 days later treating the inoculated samples with 20 parts per million by weight of DDVP.

TABLE IX

| DDVP treatment following innoculation | | Aflatoxin (p.p.m.) in wheat after 7 days incubation | | |
|---|---|---|---|---|
| Days | Amount added (p.p.m.) | Run 1 | Run 2 | Run 3 |
| 0 | None (control) | 76.3 | 92.3 | 113.0 |
| 2 [a] | 20 | 10 | 0 | 22.7 |
| 4 [b] | 20 | 10 | 26.3 | 33.9 |

[a] No aflatoxin in untreated control when DDVP was applied.
[b] Aflatoxin in untreated control avg. 29.3 parts per million by weight when DDVP was applied.

From the above it is evident that the application of DDVP residues reduced aflatoxin production on wheat even when applied 2 or 4 days following inoculation of the wheat with the fungus.

EXAMPLE IX

This example shows typical enol phosphates that may be used to inhibit or prevent the formation of aflatoxins. The compounds to be tested were suspended into 50 milliliters of sterile water and added to jars containing 25 grams of sterilized shredded wheat to give a final concentration of 10 parts per million by weight of compound in the shredded wheat substrate. The jars were inoculated with *A. flavus*, capped and placed in an enclosure maintained at 80° F. for 6 days. The aflatoxin was extracted with chloroform and analyzed by standard techniques with the following results.

TABLE X

| Compound | Aflatoxin content (micrograms/ml.) | |
|---|---|---|
| | B₁ | G₁ |
| Positive inoculated control | 0.18 | 0.19 |
| Uninoculated control | (a) | (a) |
| DDVP, inoculated | (a) | (a) |
| $\underset{CH_3O}{\overset{CH_3O}{>}}\overset{O}{\underset{\|}{P}}OCH=CHCl$ inoculated | (a) | (a) |
| $\underset{C_2H_5O}{\overset{C_2H_5O}{>}}\overset{O}{\underset{\|}{P}}OCH=CCl_2$ inoculated | (a) | (a) |
| $\underset{CH_3O}{\overset{CH_3O}{>}}\overset{O}{\underset{\|}{P}}OC=CH\overset{O}{\underset{\|}{C}}OCH_3$ inoculated (with CH₃) | (a) | (a) | a Too low to determine.

EXAMPLE X

Following a procedure similar to that disclosed in Example IX except suspending the compound in 110 milliliters of sterile water and using a chemical solution containing glucose instead of shredded wheat as substrate, the following results were obtained. Each test was allowed to run for 7 days with one set of containers being agitated while a duplicate set was allowed to remain standing still. The samples were then analyzed for aflatoxin and compared to an inoculated control. The results are reported in Table XI.

TABLE XI

| Compound | Dosage (p.p.m.) | Percent aflatoxin inhibition | |
|---|---|---|---|
| | | With agitation | Standing |
| DDVP | 10 | 100 | 100 |
| $\underset{C_2H_5}{\overset{C_2H_5}{>}}\overset{O}{\underset{\|}{P}}OCH=CHCl$ | 10 | 40 | 7 |
| $\underset{CH_3O}{\overset{CH_3O}{>}}\overset{O}{\underset{\|}{P}}OC=CH\overset{O}{\underset{\|}{C}}OCH_3$ (with CH₃) | 10 | 70 | 50 |
| DDVP-PVC pellets | 20 | 100 | 80 |

The following compounds may also be used to inhibit or prevent mycotoxin production.

$\underset{C_3H_7O}{\overset{CH_3O}{>}}\overset{O}{\underset{\|}{P}}OCH=CCl_2$     $\underset{C_3H_7O}{\overset{C_3H_7O}{>}}\overset{O}{\underset{\|}{P}}OC=CCl_2$ $\underset{C_2H_5O}{\overset{C_2H_5O}{>}}\overset{O}{\underset{\|}{P}}OCH=CH\overset{O}{\underset{\|}{C}}OCH_3$     $\underset{C_4H_9O}{\overset{CH_3O}{>}}\overset{O}{\underset{\|}{P}}OC=CCl_2$

I claim as my invention:

1. A method of inhibiting mycotoxin production of fungi of the class Fungi Imperfecti which comprises applying to the fungus of that class a dosage effective to control the production of mycotoxin of a compound of the formula:

$$\underset{R'}{\overset{R}{>}}\overset{O}{\underset{\|}{P}}-O-\underset{\underset{A}{|}}{C}=C\overset{Y}{\underset{Z}{<}}$$

where R and R' each is C₁-C₄ alkyl, A is hydrogen or methyl, Y is hydrogen or chlorine and Z is chlorine or $$-\overset{O}{\underset{\|}{C}}O$$

2. The method according to claim 1 wherein A is hydrogen and Z is chlorine.
3. The method according to claim 2 wherein R and R' each is methyl and Y is chlorine.
4. The method according to claim 3 wherein the fungus is *Aspergillus flavus*.
5. The method according to claim 3 wherein the fungus is *Fusarium roseum* var. *graminearum*.
6. The method of claim 1 wherein the compound is applied to the fungus as a solution.
7. The method according to claim 1 wherein the compound is applied to the fungus in the vapor phase.
8. The method according to claim 7 wherein the compound is incorporated in a plasticized polyvinyl chloride resin.
9. The method according to claim 1 wherein R and R' each is methyl, A is methyl, Y is hydrogen and Z is $$-\overset{O}{\underset{\|}{C}}O$$

methyl.

10. The method according to claim 2 wherein R and R' each is ethyl and Y is hydrogen.
11. The method according to claim 1 wherein the fungus is present on a substrate.

References Cited

UNITED STATES PATENTS

| 3,130,120 | 4/1964 | Schultz et al. | 424—219 |
| 3,071,610 | 1/1963 | Senkbeil | 424—219 |
| 3,318,769 | 5/1967 | Folckemer et al. | 424—83 X |

ALBERT T. MEYERS, Primary Examiner

L. SCHENKMAN, Assistant Examiner

U.S. Cl. X.R.

424—219

PO-1050
(5/69)

UNITED STATES PATENT OFFICE
CERTIFICATE OF CORRECTION

Patent No. 3,798,323      Dated March 19, 1974

Inventor(s)     John S. Leary, Jr.

It is certified that error appears in the above-identified patent and that said Letters Patent are hereby corrected as shown below:

In claim 1, that part of the claim appearing at lines 20-22, reading "$-\overset{\overset{O}{\|}}{C}O$" should read -- $-\overset{\overset{O}{\|}}{C}-O$ methyl. -- .

In claim 9, that part of the claim appearing at lines 40-42, reading "$-\overset{\overset{O}{\|}}{C}O$" should read -- $-\overset{\overset{O}{\|}}{C}O$ methyl.-- cancel "methyl." at line 43.

Signed and sealed this 28th day of January 1975.

(SEAL)
Attest:

McCOY M. GIBSON JR.            C. MARSHALL DANN
Attesting Officer             Commissioner of Patents